Sept. 12, 1967 — A. N. DE WILDE — 3,341,229
ADJUSTABLE CONDUIT JOINT
Filed Nov. 14, 1963 — 2 Sheets-Sheet 1

INVENTOR.
AMBROSIUS N. DE WILDE
BY Howard L. Johnson
ATTORNEY

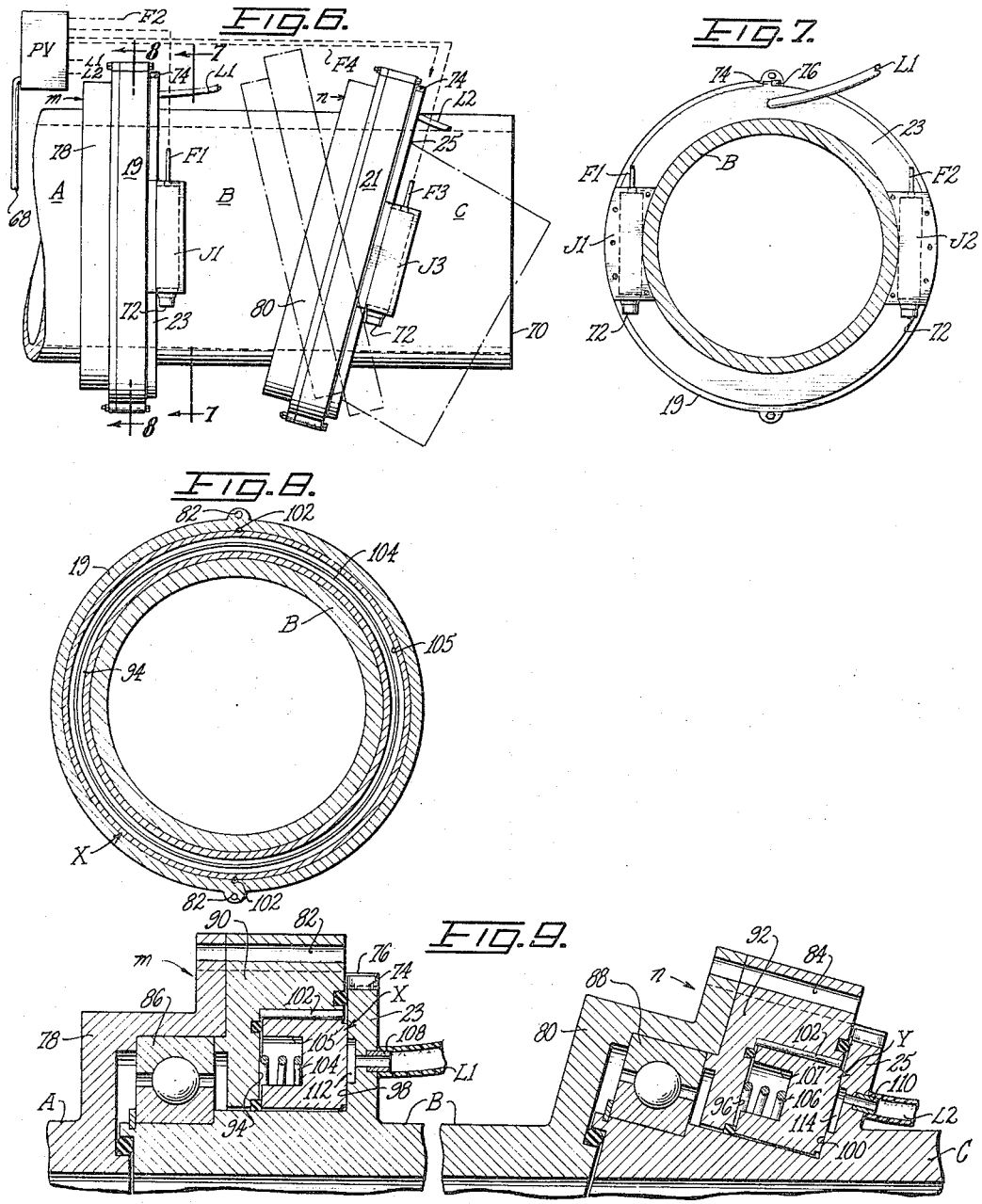

United States Patent Office 3,341,229
Patented Sept. 12, 1967

3,341,229
ADJUSTABLE CONDUIT JOINT
Ambrosius N. De Wilde, Los Angeles, Calif.
(4181 Kling St., Burbank, Calif. 91505)
Filed Nov. 14, 1963, Ser. No. 323,758
8 Claims. (Cl. 285—184)

This invention relates to a segmented joint construction of at least three end-to-end segments wherein, by progressive relative rotation of the short, intermediate segment, a corresponding change is made in the longitudinal alignment of the anterior and posterior segments. In other words, the three segments continue to be disposed in successive end abutment, and merely by rotation of the intermediate and/or the terminal segment, the angle of intersection of the longitudinal axes of the three segments are varied with respect to at least two of them. For example, with three initially longitudinally aligned segments (the proximate segment remaining stationary), the distal segment—by its own rotation—may be inclined progressively from the common longitudinal axis, and at any such frozen position of inclination to the intermediate segment, it may then be rotated 360° by turning the intermediate segment. Alternately, with the distal segment restrained against its own rotation, by rotating the intermediate segment, the degree of inclination of the distal segment is varied without changing its direction of inclination. Viewed another way, the distal segment may be turned 360° in a conic pattern, of which the apex of the theoretical cone lies within the proximate segment, along its longitudinal axis.

It is intended that the three end-to-end segments remain continually in substantial end abutment, and their relative inclination from the original longitudinal axis (which need not be straight) is based on the condition that the two transverse planes which separate the successive segment are non-parallel—that is, they are angularly disposed to each other. Consequently the intermediate segment is wedge shaped in longitudinal axial section. Conveniently one of the two planes of separation between adjacent segments is perpendicular to the longitudinal axis; preferably the engagement face of the proximate or stationary segment is thus perpendicular. However this need not be so, and thus both end faces of the intermediate segment (and the correspondingly slanted, adjacent face of the other two segments) may be inclined at non-perpendicular angles to the overall longitudinal axis.

The three endwise aligned segments, which are thus adjustably coupled together to form an elongated composite member or joint, may be solid; and adjustment of the segmented elbow to various positions may serve, for example, to position a communicative signal which is held or actuated by the movable terminal segment. Again, such a solid segmented member may serve to transmit a light beam or an electric current along its length, or to convey heat therealong in a temperature measuring device.

A particular application is obtained by employing tubular segments which thus form a continuous fluid conduit along their length. For this purpose, annular seals are provided at each of the two planes of separation, which seals may form part of the coupling means. This such construction may be associated with annular bearing means at each intersection.

In addition, rotational operating means are provided at each such plane of separation, whereby either the intermediate or the terminal segment may be selectively and independently rotated a measured amount as required.

In one embodiment wherein the aligned segments are tubular, and jointly form a fluid conduit, the proximate segment may be represented by the outlet passage of a reaction or ejection chamber of a fluid propulsion motor such as forms part of a space rocket, a guided land vehicle or aquatic vessel (whether operating on the surface or underwater). Variable positioning of the aligned conduit segments which thus convey an ejected propulsion fluid (gaseous and/or liquid) therethrough to the exterior, may ths provide an important element in the guidance system of such vehicle or craft.

However, the present adjustable conduit joint—even when tubular—is not limited to use at the outlet end of a fluid line, but may be connected at both of its ends to conventional fluid conduits of any length and direction which it is desired to couple together for continuous flow of conveyed material. The versatility of such a preformed and adjustable elbow enables its ready use, for example, in plumbing installations in lieu of "custom bending" each joint. Thus, the projecting ends of diverging pipes which are embedded in a building or other structure, can be quickly coupled together by such an adjustable elbow.

Other objects and advantages will become apparent as the description proceeds, having particular reference to the presently preferred constructions which embody the invention as here illustrated in the accompanying drawings wherein FIG. 1 is a side elevational view of one form of my adjustable conduit joint, with inclined positions of the distal or terminal segment indicated in phantom;

FIG. 6 is a side elevational view of another embodiment of the invention wherein the aligned segments form an exhaust conduit for a jet motor, with the fluid connections to the brakes and rotational nozzles indicated schematically;

FIG. 7 is a transverse sectional view along the line 7—7 of FIG. 6;

FIG. 8 is a transverse sectional view along the line 8—8 of FIG. 6; and

FIG. 9 is a fragmental longitudinal section through the construction of FIG. 6.

Figure 1:
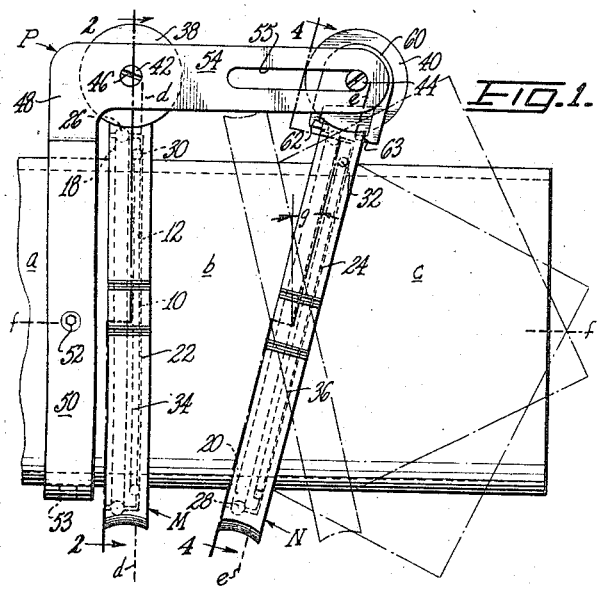

In the embodiment here detailed, three tubular segments $a$, $b$ and $c$ (typically cylinders of similar diameter) are disposed end-to-end in terminal abutment so that their interiors form a continuous fluid channel in the desired direction of flow. With respect to the remaining segments, the segment $a$ may be regarded as rotationally fixed or stationary; and the segment $c$ may be regarded as a channel outlet, particularly when it is employed to impart directional thrust to an ejection chamber or structure which is based on or attached to the segment $a$. However the present representation is not intended as a limitation upon the lengths of segments $a$ or $c$, nor as an indication that they each are necessarily straight or are normally disposed in a straight line lengthwise from their respective abutments with intermediate segment $b$.

It will be observed that the planes of separation $d$—$d$ and $e$—$e$ between the successive or adjacent segment pairs $a$–$b$ and $b$–$c$ are both transverse to the length of the conduit as a whole, and are non-parallel to each other, thus giving a wedge shape to the intermediate segment $b$. In its simplest form, the plane $d$—$d$ which corresponds to the end face 10 of the fixed segment $a$, and to the generally parallel adjacent or abuting face 12 of the intermediate segment $b$, is perpendicular to the longitudinal axis $f$—$f$ of the conduit. In turn, the more distal or outer, transverse plane $e$—$e$ is inclined along its diameter from the first transverse plane by a (variable) angle $g$. Thus, if its diameter were perpendicular to the plane of the drawing in FIG. 1, and it were tilted counterclockwise on this diameter by g°, the two planes d—d and e—e would then be parallel. However (dependent upon the desired inclination of the segment c), the diametric axis upon which e—e is tilted, may also be further tilted to a non-parallel, equally inclined, position (to d—d) in the opposite direction. However such "tilting" is effected only by progressive rotation of one or more of the coupled segments as explained below.

The respective end-abutment faces 10, 12 and 14, 16 of the adjacent segments a, b and c are each generally parallel to the corresponding face of its opposing member, but do not necessarily frictionally engage, especially when sealing means are otherwise provided or are not required. It will be apparent, however, that if one started with an elongated bar or rod, the three segments could be simply formed therefrom by two transverse severances, non-parallel to each other and longitudinally spaced apart, along the bar.

Combined sealing and operative or rotational means are provided at each plane of separation d—d and e—e, here embodied in an annular construction which is designated generically at M and N. In each case there is an outward projecting, peripheral flange or lip 18, 20 located at the abutment end of the particular segment (a and b) which remains fixed relative to the more distally adjacent, rotatable segment. The latter "downstream" segments (b and c) each carry an outwardly projecting and axially overlying, mating flange or annular boss 22, 24 which is rotatably coupled to the inwardly adjacent and concentric flange by an intermediate circle of ball bearings 26, 28. Along the intersection of each joint thus formed, there is disposed an annular sealing gasket or compressible O-ring 30, 32. It will be apparent that the abutment faces 14, 16 which are produced by severing a cylinder transversely along the inclined plane e—e, are elliptical rather than annular (and hence do not match when rotated a quarter turn, but match again at a half rotation or 180°); however the coupling and operating unit N being annular, the segment c can be rotated on its longitudinal axis without difficulty and the seal about the joint is maintained even when the end abutment faces do not matchingly mate. It may be desirable however to form the tubular walls of the adjacent segment ends of sufficient thickness that the two elliptical faces still radially overlap when one is rotated a quatrer turn and placed in end abutment with the other.

Initial rotation inclines the segment c relative to the original axis f—f. Subsequent rotation of the segment b (without relative movement of b and c) then rotates the inclined segment c 360° (in either direction). By a combination of the two rotational movements (in any sequence) the segment c can be located at any desired intermediate position.

Figure 2:
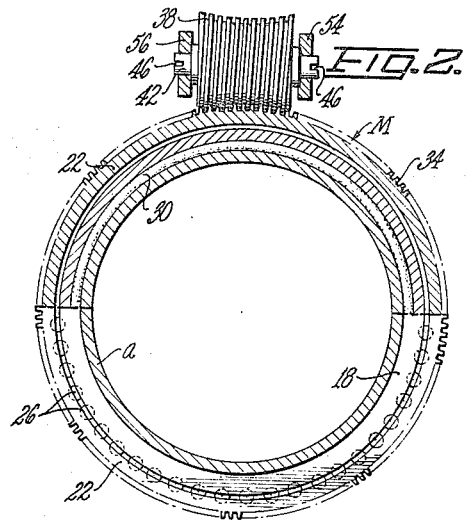
FIG. 2 is a transverse sectional view along the line 2—2 of FIG. 1.
Figure 3:
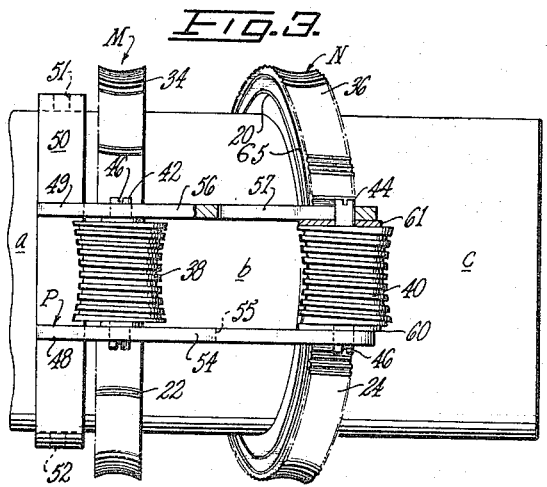
FIG. 3 is a top plan view of FIG. 1.
Figure 4:
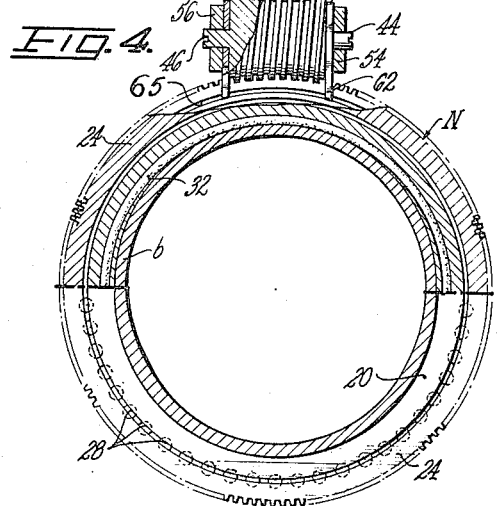
FIG. 4 is a transverse sectional view as seen along the line 4—4 of FIG. 1, with portions broken away.
Figure 5:
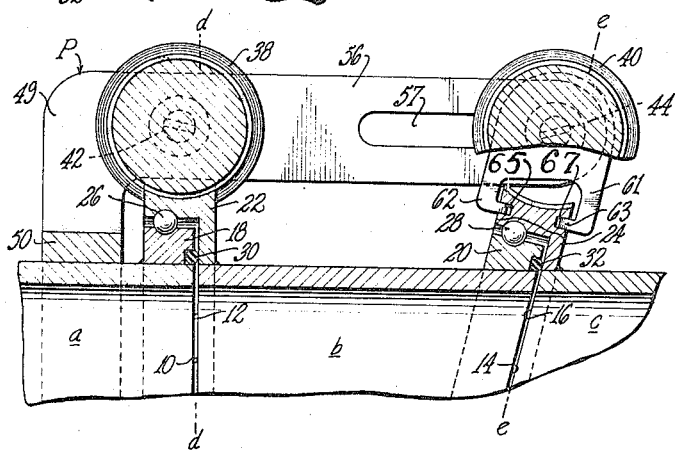
FIG. 5 is a fragmental longitudinal section with portions broken away.

Essentially the outer circumferential face of each annular band 22, 24 constitutes a ring gear, with its teeth 34, 36 engaged by a respective worm or drive screw 38, 40, which may be tapered or longitudinally concave (FIGURE 2) for better engagement of the gear teeth 34, 36. The axle 42, 44 of each screw 38, 40 may be diametrically slotted 46 at each end for reception of a screwdriver or similar tool (not shown) by which it can thus be (handily) turned in either direction by a measured amount. It will be apparent, however, that even in the absence of drive mechanism such as the worm-engaged ring gear, each segment (b and c) can be rotated by hand or by application of a leverage tool such as a wrench.

The pair of screws 38, 40 are held in engagement with the respective ring gear 34, 36 by means of a mounting frame P which comprises a pair of upstanding posts 48, 49 projecting from a yoke 50 having its arcuate underface secured to the fixed segment a by an embracing length 50 which may be clamped or affixed to the conduit exterior at any initially designated rotational position by spot welds or screws 51, 52, 53 or any other suitable means.

From the posts 48, 49, a pair of laterally separated, support arms 54, 56 extend lengthwise along the conduit, transversely overlying the rings M and N and spaced a short distance radially outward therefrom. The one worm 38 which is adjacent the perpendicular plane d—d (which worm consequently does not move back and forth lengthwise to the conduit, as does the other worm 40) is journalled between the arms 54, 56. Distally therefrom, each support arm 54, 56 is formed with an elongated, parallel slot 55, 57 through which is inserted the respective ends of the axle 44 of the slidable worm 40.

It will be seen from comparison of the different rotational positions of the ring N in FIGURE 1, that (in relation to the mounting frame P) that span or length of the ring gear 36 which is continually engaged by the worm, also oscillates lengthwise to the conduit, so that the worm accordingly moves toward and away from the posts 48, 49, as the segment c is rotated. Consequently there is a pair of swingable tabs 60, 61 traversed by the axle 44 and positioned between the end of the worm 40 and the adjacent inner face of the respective support arm 54, 56. Each tab has a dependent pair of inturned fingers 62, 63 which ride in a corresponding groove 65, 67 of the annulus 24, and thus hold the concave worm in registration with the outward projecting teeth 36 of the ring gear.

Alternately or in addition to mechanical means for rotating one or more segments to a desired inclination (especially while a fluid stream is standing or moving through the conduit which they provide) any movable segment may be non-manually operated and turned a desired amount by application of fluid means, which may be effected typically by more-or-less tangential ejection of spurts of liquid or vapor from a nozzle or by balanced use of an oppositely oriented pair of such nozzles which thus apply rotational force to a segment and are remotely controlled. Especially for use in conjunction with such remote, fluid operation, positive braking means are also provided, which may take the form of a brake annulus juxtaposed between the adjacent mating flanges of each coupling ring (M, N) and also desirably remotely operated as by fluid means. For this purpose the paired units of the annular flanges are specially shaped along their common plane respectively to provide (a) an open-faced, annular seating channel about one flange which permits limited axial displacement of an annular brake therefrom and (b) a brake-engaging surface about the opposing flange against which said brake annulus may be selectively applied in frictional juxtaposition.

As particularly illustrated in FIGS. 6–9, the three tubular segments A, B and C are aligned end-to-end as an outlet conduit, the fixed segment A forming part of a combustion chamber (for example, one adapted to use rocket fuel) or forming a marginal extension from a larger combustion chamber in the manner of an exhaust bay. The distal segment C accordingly provides the actual outlet mouth 70 for a jet-ejection stream from the fluid channel which is formed jointly by segments A, B, C; the longitudinal inclination of C relative to the axis of A therefor determines the resulting thrust vector of the exhaust stream, and by varying this it is possible from time to time to alter the course or trajectory of the body of the "rocket" or "vehicle" a deliberate or predetermined amount as may be required.

For this purpose, individual units of a pair of jet ejection chambers J are tangentially mounted 180° apart along the distal face 23, 25 of the respective coupling assemblies m, n of the segments B, C. Each unit J provides a hollow chamber and an exhaust port or nozzle 72 at one end, with an activating conduit F functionally connected to the inlet end. In most instances the fluid ejected through the aperture 72 is initially conveyed into the unit J through the conduit F (as from the combustion chamber by way of a bleed line 68 and pump-control valve PV). However in some cases the unit J may be a pressure flask carrying a supply of fluid (independent of and unconnected to the combustion exhaust fluid); short spurts of the confined liquid are released from time to time in response to activation of the conduit F. In such case, each conduit F may not necessarily extend beyond its support-segment B or C, and may convey (in place of fluid) an electrical current thus used to trigger jet ejection through the nozzle 72, such electrical impulse being actuated by a radio signal or the like conveyed to a tuned RF receiver (not shown) mounted on the particular segment B or C.

When the conduit F conveys fluid which is thence ejected through the aperture 72 to impart rotational thrust to the particular segment B or C, and such conduits accordingly extend forward, lengthwise overlying adjacent segments (i.e. up to A or beyond), then the coupling assemblies $m$ and $n$ are each provided with stop means adapted to limit rotation of each segment B and C to a maximum of one complete turn or approximately 360°, so that the extent to which their rotation can wind the flexible conduits F thereabout is accordingly limited. Specifically a lug 74 radially projecting from the periphery of the rotatable flange 23 or 25 (FI. 7) is disposed to laterally abut, alternate sides of an axially projecting lug 76 carried by the adjacent flange 19 or 21. Since the exhaust mouths 72 of the paired chambers J1, J2 and J3, J4 are oppositely directed, by use of one or the other of a pair, the connected segment B or C can be rotated in one direction or the other; that is, the one unit J1 will turn the segment B clockwise (FIG. 7), the other unit J2 will turn it counterclockwise.

Each annular, segment-coupling assembly $m$, $n$ is composed of an outwardly stepped, projecting flange 78, 80 (carried by segments A and B respectively), which flange is axially spaced from a proximate, straight-projecting flange 23, 25 of the distally adjacent segment B or C. In the intermediate annular space there is secured, sandwich-like, as by a bolt (not shown) through the opening 82, 84, a surrounding segment-embracing structure composed of a ball-bearing raceway 86, 88 and a larger, encircling body 90, 92. The latter is formed with an annular recess 94, 96 which opens against the adjacent face 98, 100 of the straight flange 23, 25. In this recess is disposed an annular brake X, Y locked against independent rotation by axially-directed spines or pins 102, and normally urged in frictional juxtaposition with the adjacent flange face 98, 100 by means of a compression spring 104, 106. The spring is seated in an annular groove or channel 105, 107 of the brake X, Y and bears against the forward wall of the recess 94, 96.

Accordingly, engagement of the brake X, Y restrains rotation of the straight flange 23, 25 (of the rotatable segment B or C) relative to the stepped flange 78, 80 (of the proximate segment A or B). In order to selectively relieve such braking engagement, each straight flange 23, 25 is formed with an attachment nipple 108, 110 or similar means for coupling a fluid line L1, L2. Pressurized fluid from the line L1 or L2 enters the annular chamber 112 or 114, and overcoming the tension of the spring 104 or 106, disengages the brake X or Y from its engagement with the distally adjacent flange face 98 or 100. Desirably the braking fluid in lines L1, L2 is also operated from the control pump PV in thus applying by-pass exhaust vapor (pressurized if necessary) derived from the combustion chamber by bleed line 68. Alternately however, the brake system can be operated by compressed air, hydraulic fluid, etc. Also, like the ejection units J, each brake X, Y can be remotely controlled, as by radio signals.

From the foregoing, the construction and operation of the depicted device will be readily understood and further explanation is believed to be unnecessary. However, since numerous modifications and changes will readily occur to those skilled in the art, it is not desired to limit the concept to the exact construction shown and described; and accordingly all suitable modifications and equivalents may be resorted to, falling within the scope of the invention as hereafter claimed.

I claim:

1. A movable structure comprising walls defining a fluid chamber $a$ and two tubular segments $b$ and $c$ disposed in successive end alignment with said chamber and with each other, said segments jointly forming a fluid outlet from said chamber disposed to impart direction-controlled thrust to said structure by ejection of fluid therethrough, segment $b$ being substantially wedge shaped in axial section, and selectively rotatable on such axis, transverse planes of separation between the chamber $a$ and segment $b$ and between segments $b$ and $c$ corresponding generally to the shape of the adjacent segment ends and being disposed angularly to each other and generally radial to the longitudinal direction of said fluid flow; annular sealing and bearing means disposed about each of said planes of separation and jointly embracing the respective segment ends, and thus adapting the segment $b$ to be rotated by itself relative to the chamber $a$ and to segment $c$ while permitting uninterrupted fluid flow lengthwise through segments $b$ and $c$ from chamber $a$, whereby the axial inclination of segment $c$ relative to chamber $a$ may be progressively varied both by the changing rotational position of segment $b$ alone, and by the rotation of segment $c$ alone as well as by their joint rotation; remote-controlled, ejection thrust-producing means for selectively rotating said segments, and associated, selectively-operative brake means adapted to restrain relative segment rotation at a predetermined position.

2. A composite structure forming an adjustable elbow and characterized by three discrete, approximately coaxial segments coupled together in successive end-to-end alignment, the initial segment $a$ being adapted to be rotationally fixed relative to said other segments, the intermediate segment $b$ being rotatable about its longitudinal axis relative to the fixed segment, and the terminal segment $c$ being selectively stationary and rotatable about its longitudinal axis relative to the intermediate segment, segment $b$ being substantially wedge shaped in axial section, the transverse planes of separation between successive segments corresponding generally to the shape of the adjacent segment-ends and said planes being disposed angularly to each other and generally radial to the length of said structure; annular bearing means disposed about each of said planes of separation and jointly embracing the adjacent segment-ends, whereby segments $b$ and $c$ may be rotated both jointly and individually, in each case varying the axial inclination of segment $c$ relative to segment $a$, and each of said segments $b$ and $c$ externally carrying an annular ring gear fixed thereto adjacent its plane of separation which is nearest to segment $a$; and rotary drive means functionally engaging each of said ring gears for selectively moving the respective segment a controlled amount, said drive means comprising a pair of worm gears each disposed adjacent a respective ring gear in functional engagement therewith, a mounting frame disposed generally parallel to the longitudinal axis of said segments, transversely overlying the ends of the three segments at their planes of separation and journalling said worm gears, at least one of said worm gears being movable reciprocably along the frame in order to accommodate displacement of the engaged portion of the ring gear lengthwise to the segment upon rotation thereof, and attachment means securing said frame to segment $a$.

3. The structure of the preceding claim 1 wherein the segment-embracing annular sealing and bearing means disposed about each of said planes of separation includes a mutually parallel pair of juxtaposed flanges individually carried by the respective abuting segments, and said brake means comprises an annular brake member carried by one of said flanges and adapted selectively to frictionally register with the adjacent flange and thereby restrain relative rotational movement of the pair of flanges, plus remote actuating means including brake-connected conduits for operating said brake by effecting general axial movement thereof and opposing means for relieving said brake action, and including cooperative stop means located about said sealing and bearing means for limiting the rotation of one segment relative to an adjacent segment to a maximum of approximately 360°.

4. The structure of the preceding claim 1 wherein the segment-embracing annular sealing and bearing means disposed about each of said planes of separation includes a mutually parallel pair of juxtaposed flanges individually carried by the respective abutting segments, and said brake means comprises an annular brake member carried by one of said flanges and adapted selectively to frictionally register with the adjacent flange and thereby restrain relative rotational movement of the pair of flanges, plus remote actuating means including brake-connected conduits for operating said brake by effecting general axial movement thereof and opposing means for relieving said brake action, and including cooperative stop means located about said sealing and bearing means for limiting the rotation of one segment relative to an adjacent segment to a maximum of approximately 360°; and said remote-controlled, ejection thrust-producing means for rotating each of said segments $b$ and $c$ in either direction, comprise fluid means including conduits extending lengthwise along said segments and having sufficient slack to accommodate cumulative maximum rotation of both said segments.

5. The structure of the preceding claim 1 wherein segments $b$ and $c$ are each provided with fluid ejection thrust-producing means disposed generally tangentially to their outer periphery, and adapted to rotate each respective segment a desired amount.

6. The structure of the preceding claim 1 wherein segments $b$ and $c$ are each provided with fluid ejection thrust-producing means disposed generally tangentially to their outer periphery, and adapted to rotate each respective segment a desired amount; said fluid ejection means being connected by a by-pass line to the main stream of fluid which flows through said segments from the fluid chamber $a$.

7. In combination with a vehicle having a fluid propulsion motor, the improvement comprising:
   a tubular, segmented, exhaust conduit for fluid expelled from said motor, said conduit having a proximate segment and a terminal segment, which latter is adjustable in an approximately conic pattern about an apex lying within the proximate segment;
   generally tangentially disposed, thrust-producing, fluid ejection means carried by said terminal segment and adapted selectively to rotate it in opposite directions in said conic pattern;
   selectively-operable brake means carried by said conduit and adapted to stop rotation of the terminal segment and to retain it at a desired angular position relative to the proximate segment;
   and remote control means for actuating said fluid ejection means and said brake means whereby said terminal segment may be angularly positioned to serve as a guidance element of the vehicle.

8. The combination of the preceding claim 7 wherein said fluid ejection means are supplied fluid through a by-pass line from the main stream of fluid which flows through the exhaust conduit from the fluid propulsion motor.

References Cited
UNITED STATES PATENTS

| | | | |
|---|---|---|---|
| 142,879 | 9/1873 | Weaver | 285—184 X |
| 2,886,262 | 5/1959 | Fletcher | 285—184 X |
| 2,986,877 | 6/1961 | Emmons | 60—35.55 |
| 3,067,579 | 12/1962 | Olbrich | 285—181 X |
| 3,162,011 | 12/1964 | Mullins | 60—35.55 |

CARL W. TOMLIN, *Primary Examiner.*

D. W. AROLA, S. R. MILLER, *Assistant Examiners.*